United States Patent
Funke

(10) Patent No.: US 7,648,378 B2
(45) Date of Patent: Jan. 19, 2010

(54) PIPESTRING COMPRISING COMPOSITE PIPE SEGMENTS

(75) Inventor: Daniel J. Funke, San Diego, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 371 days.

(21) Appl. No.: 11/751,709

(22) Filed: May 22, 2007

(65) Prior Publication Data

US 2007/0284873 A1 Dec. 13, 2007

Related U.S. Application Data

(60) Provisional application No. 60/747,863, filed on May 22, 2006.

(51) Int. Cl.
*E21B 43/00* (2006.01)

(52) U.S. Cl. ...................................... 439/194

(58) Field of Classification Search ......... 439/191–194; 340/855.1; 174/47
See application file for complete search history.

(56) References Cited

U.S. PATENT DOCUMENTS

| 749,633 | A | * | 1/1904 | Seeley ........................ 439/192 |
| 2,301,783 | A | * | 11/1942 | Lee ............................. 439/191 |
| 2,531,120 | A | * | 11/1950 | Feaster ....................... 175/104 |
| 2,967,283 | A | * | 1/1961 | Medney ........................ 439/85 |
| 3,170,137 | A | * | 2/1965 | Brandt .................... 340/855.1 |
| 3,253,245 | A | * | 5/1966 | Brandt ........................ 439/191 |
| 3,696,332 | A | * | 10/1972 | Dickson et al. .......... 340/855.1 |
| 4,220,381 | A | * | 9/1980 | van der Graaf .......... 340/853.7 |
| 4,445,734 | A | * | 5/1984 | Cunningham ................ 439/194 |
| 4,690,212 | A | * | 9/1987 | Termohlen .................. 166/65.1 |
| 5,141,051 | A | | 8/1992 | Lenhart |
| 5,332,049 | A | | 7/1994 | Tew |
| 5,401,062 | A | | 3/1995 | Vowles |
| 6,309,260 | B1 | * | 10/2001 | Shannon ...................... 439/772 |
| 7,083,204 | B1 | | 8/2006 | Miller et al. |
| 7,156,676 | B2 | * | 1/2007 | Reynolds, Jr. ............... 439/194 |
| 7,528,736 | B2 | * | 5/2009 | Hall et al. ................. 340/854.9 |
| 2006/0066102 | A1 | | 3/2006 | Leslie et al. |
| 2006/0108803 | A1 | | 5/2006 | Reynolds, Jr. |
| 2007/0056723 | A1 | | 3/2007 | Hall et al. |

FOREIGN PATENT DOCUMENTS

GB 2344608 6/2000

OTHER PUBLICATIONS

GB0709805.6; Search Report dated Aug. 28, 2007.

\* cited by examiner

*Primary Examiner*—Neil Abrams
(74) *Attorney, Agent, or Firm*—Renner, Otto, Boisselle & Sklar LLP

(57) ABSTRACT

A pipestring ($12$) wherein the leading coupling portion ($22_1$) of a first pipe segment ($14_1$) and the trailing coupling portion ($24_2$) of a second pipe segment ($14_2$) are coupled together. A leading seal part ($34_1$) is installed in the leading coupling portion ($22_1$) of the first pipe segment ($14_1$) and a trailing seal part ($36_2$) is installed in the trailing coupling portion ($24_2$) of the second pipe segment ($14_2$). The seal parts ($34_1$, $36_2$) interface to form a fluid seal between the composite pipe segments ($14_1$, $14_2$), and also to provide an electrically conductive path between their electrical lines ($46_1$, $46_2$).

17 Claims, 11 Drawing Sheets

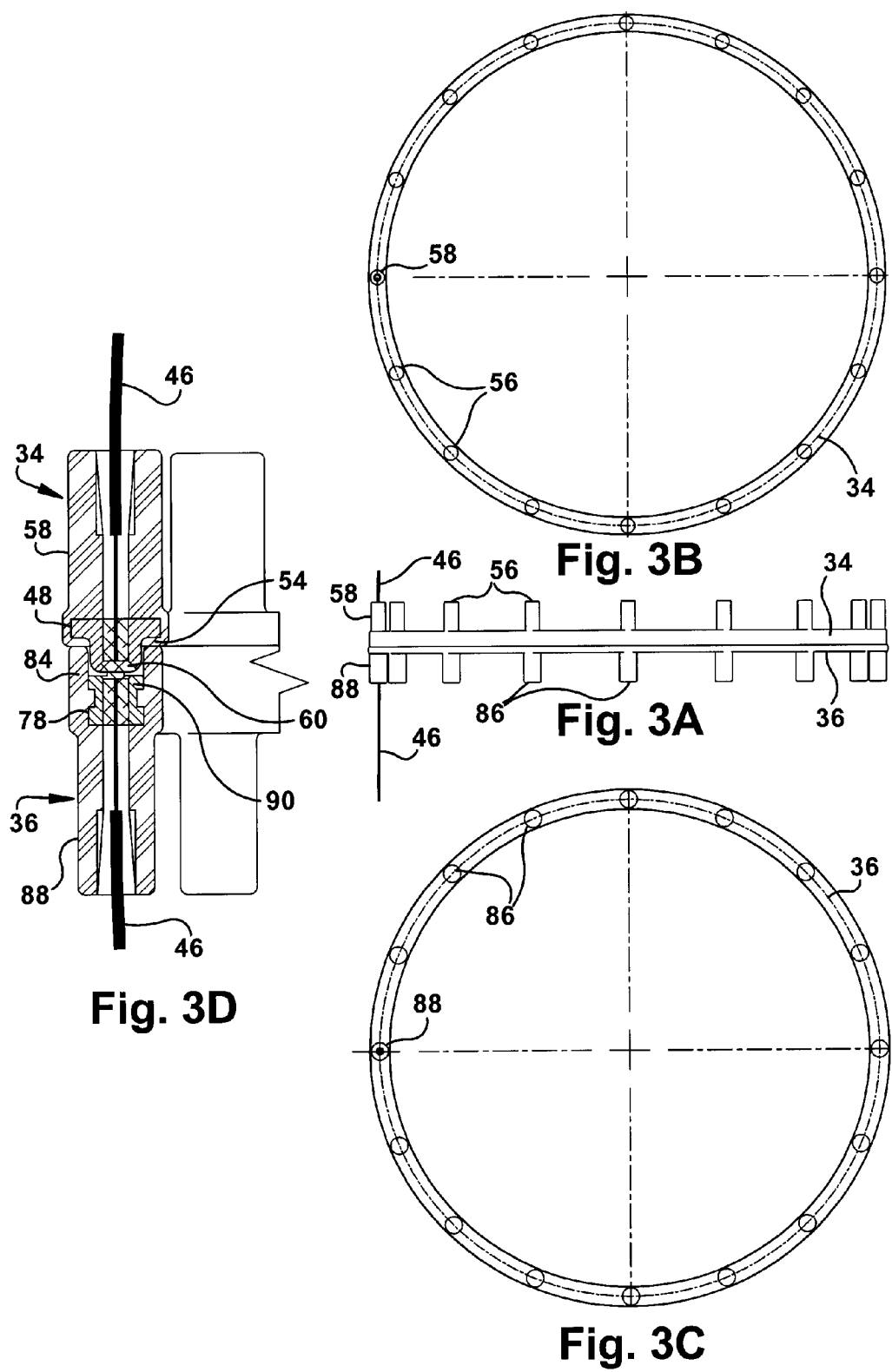

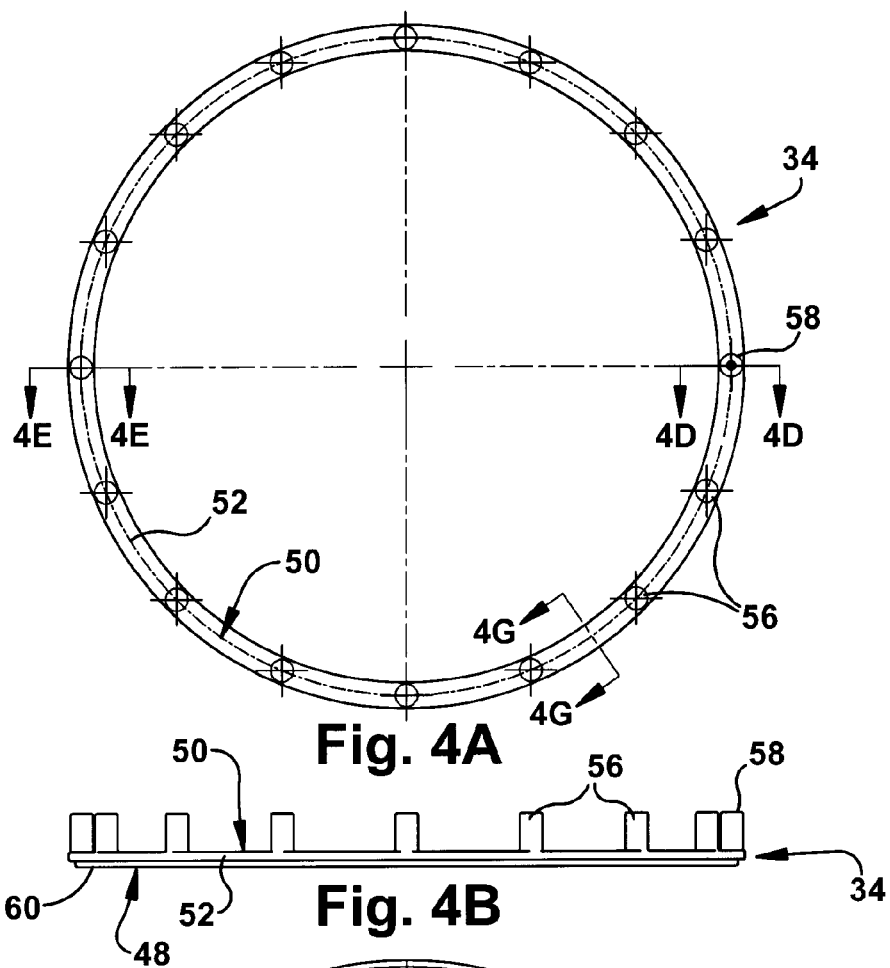
Fig. 4A
Fig. 4B
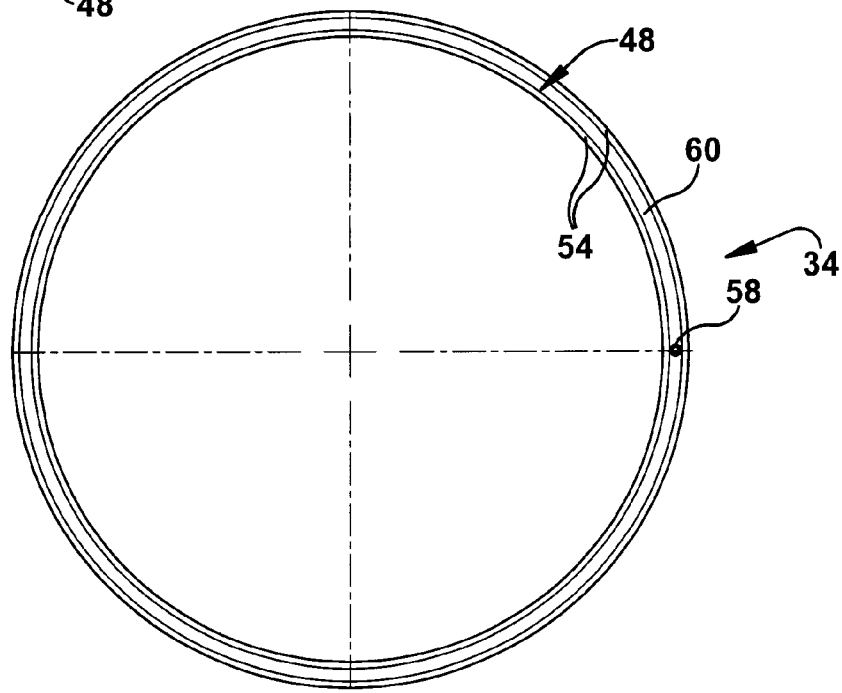
Fig. 4C

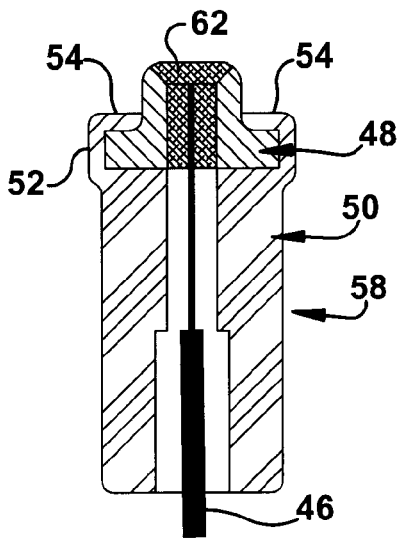
Fig. 4D
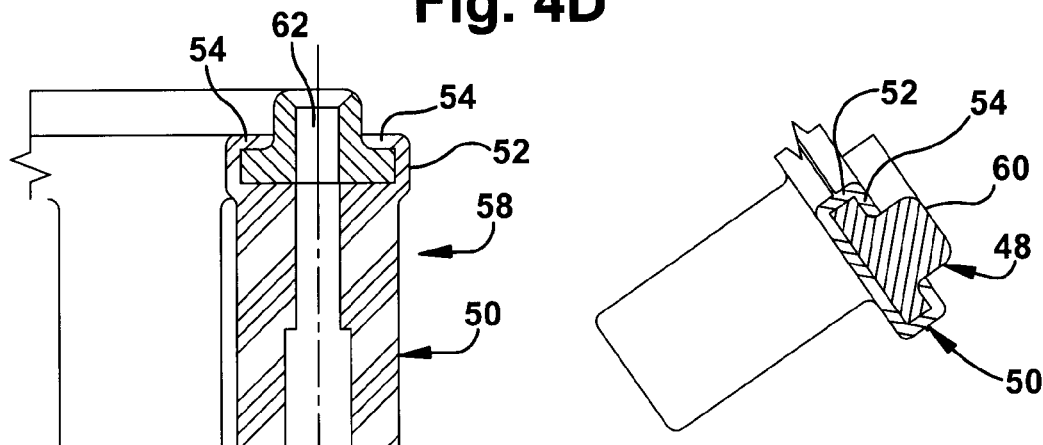
Fig. 4E   Fig. 4F
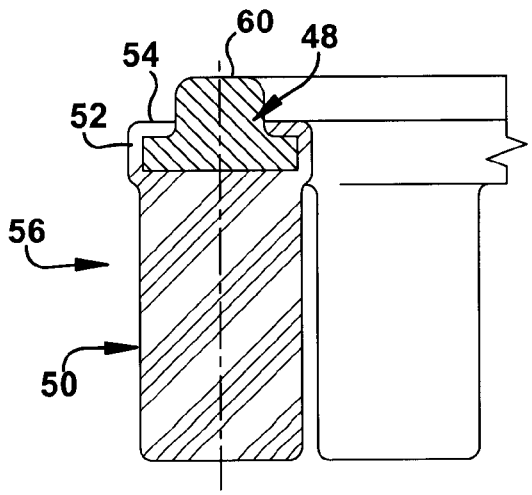
Fig. 4G

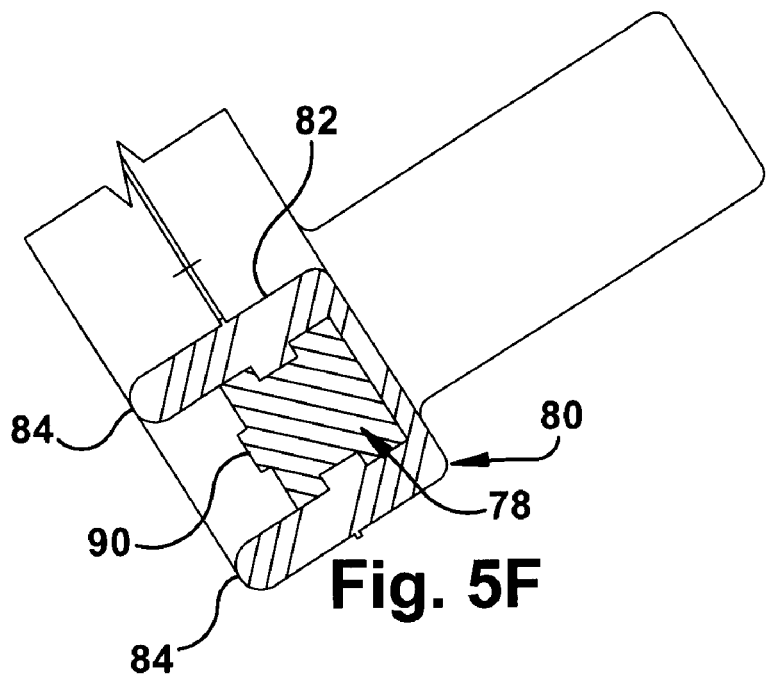
Fig. 5F
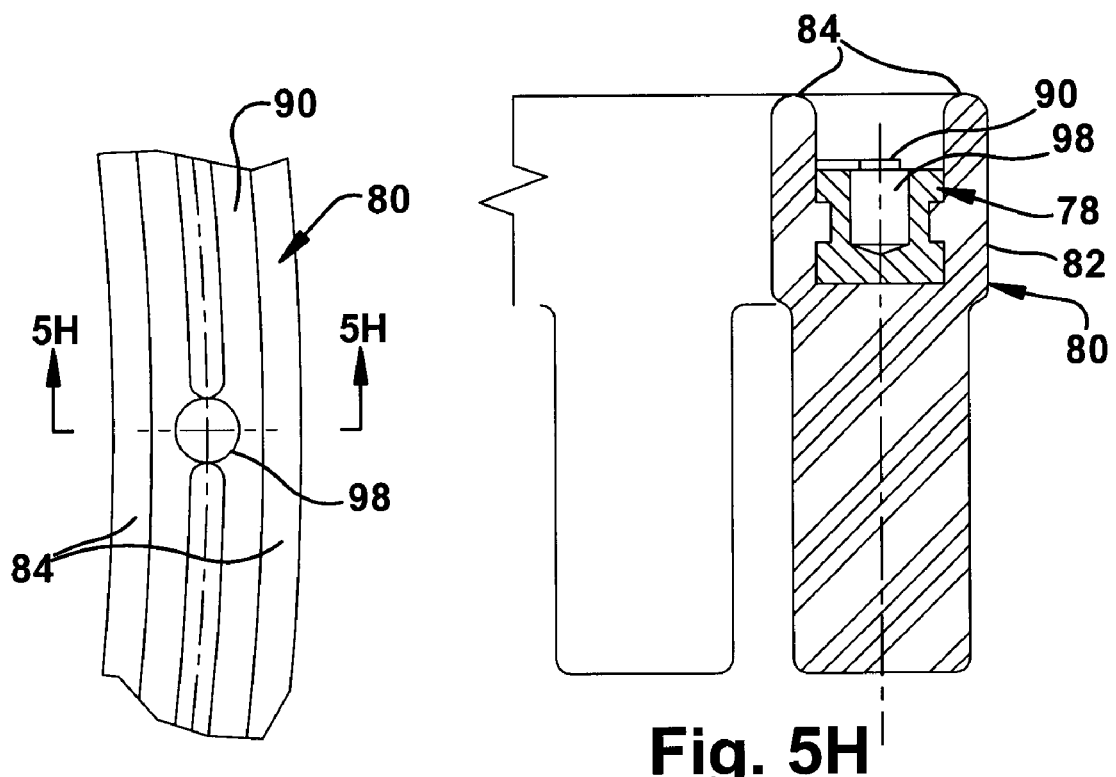
Fig. 5G
Fig. 5H

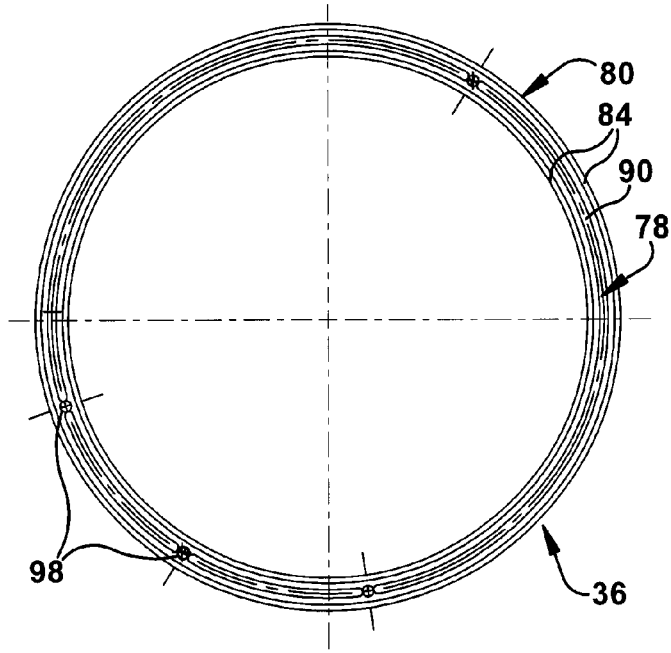
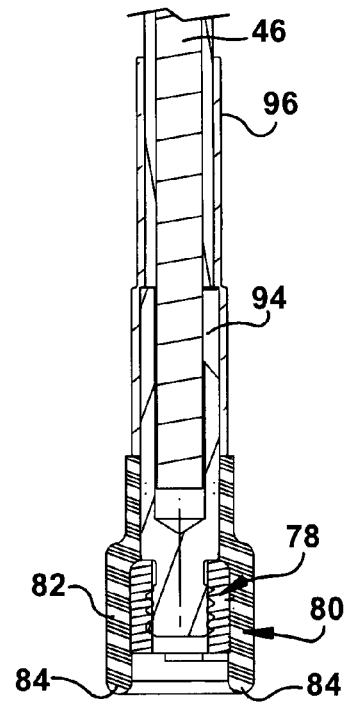
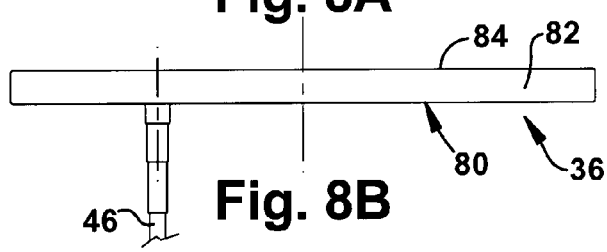
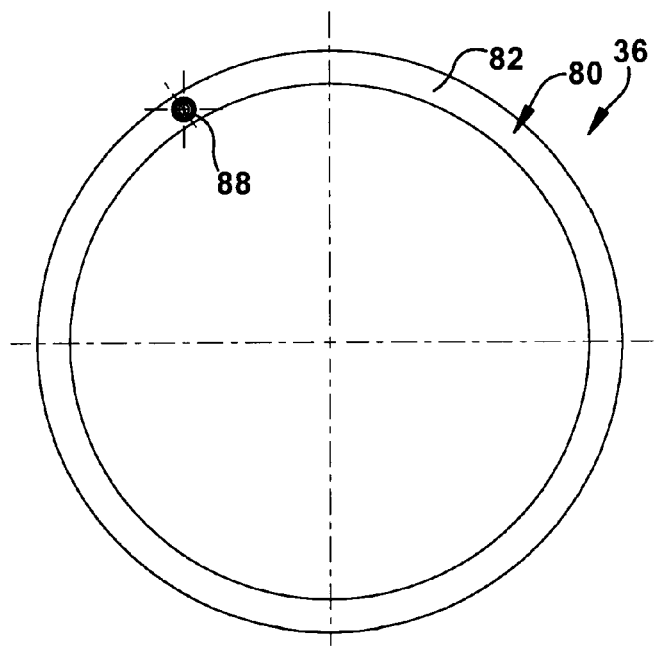
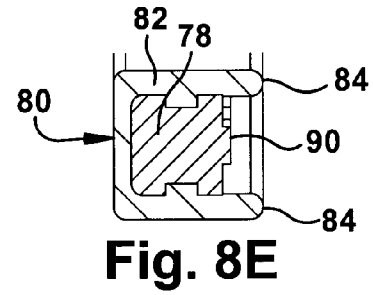
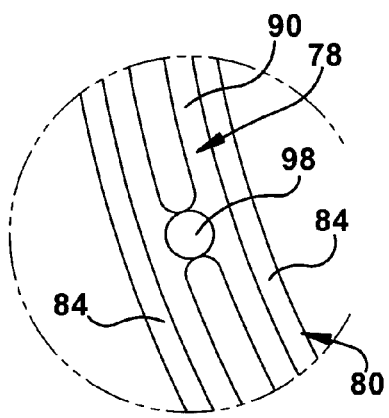
Fig. 8A
Fig. 8B
Fig. 8C
Fig. 8D
Fig. 8E
Fig. 8F

PIPESTRING COMPRISING COMPOSITE PIPE SEGMENTS

RELATED APPLICATION

This application claims priority under 35 U.S.C. §119 (e) to U.S. Provisional Patent Application No. 60/747,863 filed on May 22, 2006. The entire disclosure of this provisional application is hereby incorporated by reference.

GENERAL FIELD

A pipestring comprising a series of pipe segments, wherein each pipe segment has a primary conduit portion made of a composite material, a leading coupling portion, and a trailing coupling portion.

BACKGROUND

A drill rig used to access underground reserves (petroleum, water, minerals, etc.) typically employs a pipestring comprising a series of pipe segments coupled together end-to-end. A drill bit is mounted to the starting pipe segment and, when power is applied to the last pipe segment, the drill bit is rotated to grind and penetrate the contacting wall of the wellbore. Drilling fluids can be provided to the drill bit through the conduit created by the series of end-to-end coupled pipe segments. With ultra-deep, deep-direction, short-radius, and/or extended-reach drilling, it is usually practical, and often necessary, to use pipe segments having their primary conduit portions made of a composite material (i.e., composite pipe segments).

SUMMARY

A pipestring wherein each pipe segment includes a primary conduit portion made of a composite material, a leading seal part installed in its leading coupling portion, a trailing seal part installed in its trailing coupling portion, and an electrical line extending through the primary conduit portion. Each seal part includes an electrically conductive ring and an electrically insulating molded seal body. The seal parts interface to form a fluid seal between each coupled pair of coupling portions and to also provide a conductive path between the electrical lines in the respective pipe segments. In a relatively long pipestring (e.g., one used in a drill rig), the seal parts allow an electrically conductive path to extend from a beginning pipe segment to an end pipe segment. The electrical lines can be simple wires (e.g., to verify sealing/coupling), electrical power leads (e.g., to provide power to drilling/measurement devices), control signal cables (e.g., to control equipment operation), fiberoptic filaments (e.g., to obtain measure-while-drilling data) or other such lines. These and other features of the pipestring, the pipe segments, and/or the seal parts are fully described and particularly pointed out in the claims. The following description and annexed drawings set forth in detail certain illustrative embodiments, these embodiments being indicative of but a few of the various ways in which the principles may be employed.

DRAWINGS

FIGS. 3A-3D are side, top, bottom and sectional views of the seal parts in an interfacing relationship.

FIGS. 4A-4G are side, top, bottom, close-up, and sectional views of the leading seal part shown in FIGS. 3A-3D.

FIGS. 5A-5H are side, top, bottom, close-up, and sectional views of the trailing seal part shown in FIG. 3A-3D.

FIGS. 8A-8F are side, top, bottom, and sectional views of the trailing seal part shown in FIGS. 6A-6D.

DETAILED DESCRIPTION

Figure 1:
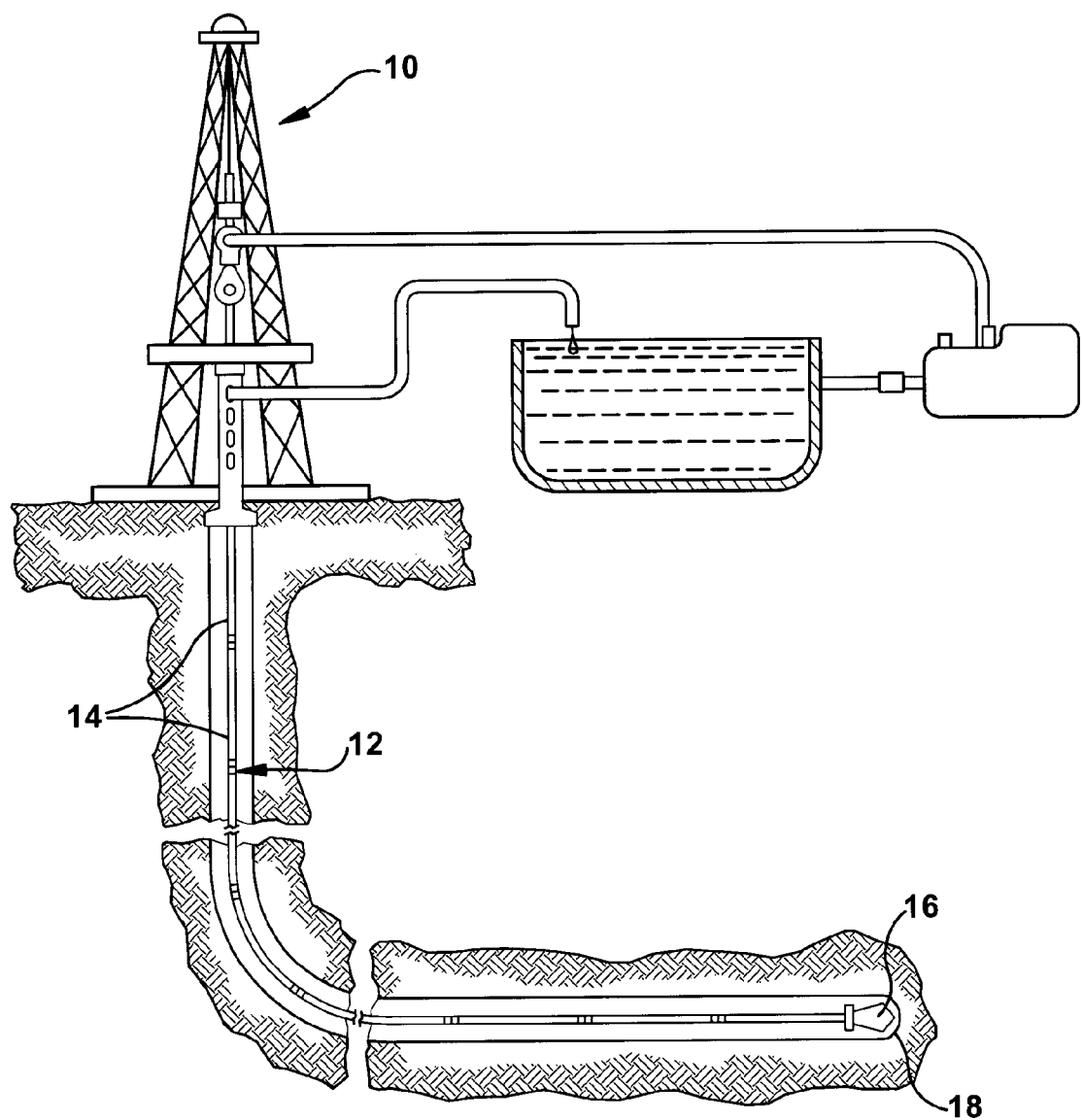
FIG. 1 is a schematic view of a drill rig wherein the pipestring comprises a series of composite pipe segments.

Referring now to the drawings, and initially to FIG. 1, a drill rig 10 is shown wherein the pipestring 12 comprises a series of composite pipe segments 14 coupled end-to-end. A drill bit 16 is mounted to the starting pipe segment and, when power is applied to the last pipe segment, the bit 16 is rotated to grind and penetrate the contacting wall of the wellbore 18. An appropriate drilling fluid can be provided to the drill bit 16 through the conduit formed by the pipestring 12.

Figure 2A:
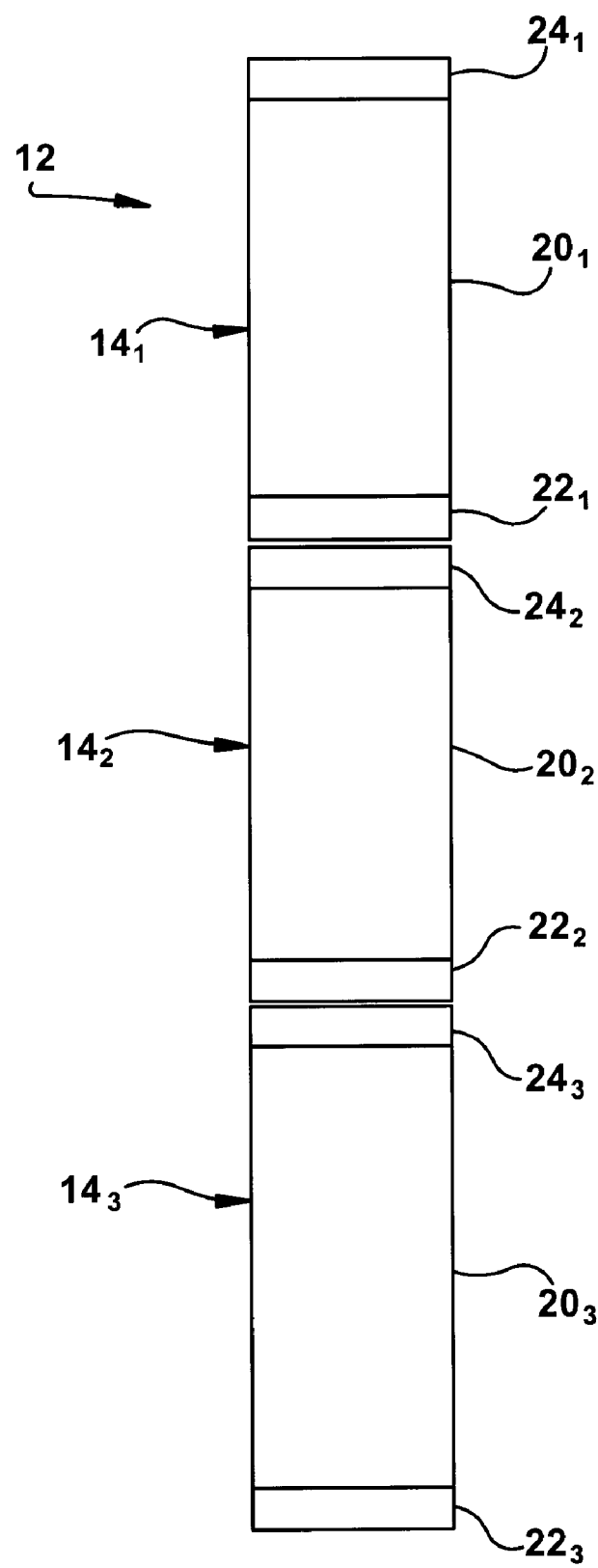
FIG. 2A is an isolated view of first, second, and third pipe segments of the pipestring.

Referring now to FIG. 2A, a first pipe segment $14_1$, a second pipe segment $14_2$, and a third pipe segment $14_3$ of the pipestring 12 are shown in more detail. In the present description, the term "leading" is used to designate the region of the pipe segment 14 closest to the drill bit 16 and the term "trailing" is used to designate the opposite region of the pipe segment 14. For example, in the orientation shown in FIG. 2A, the lowermost regions of the pipe segments 14 are the leading regions and the uppermost regions of the pipe segments 14 are the trailing regions. This convention is adopted, and this orientation is shown, for no other reason than to ease explanation by having a reference direction to use during discussion of the pipe segments 14.

The first pipe segment $14_1$ comprises a primary conduit portion $20_1$, a leading coupling portion $22_1$, and a trailing coupling portion $24_1$. The second pipe segment $14_2$ comprises a primary conduit portion $20_2$, a leading coupling portion $22_2$, and a trailing coupling portion $24_2$. The third pipe segment $14_3$ comprises a primary conduit portion $20_3$, a leading coupling portion $22_3$, and a trailing coupling portion $24_3$. The leading coupling portion $22_1$ of the first pipe segment $14_1$ is coupled to the trailing coupling portion $24_2$ of the second pipe segment $14_2$, and the leading coupling portion $22_2$ of the second pipe segment $14_2$ is coupled to the trailing coupling portion $24_3$ of the third pipe segment $14_3$. A multitude of pipe segments 14 are typically used in a pipestring and/or drill string. That being said, the pipestring 12 could comprise as few as two pipe segments 14. In such a case, it would only be necessary for the first pipe segment $14_1$ to include a leading coupling portion $22_1$ and the second pipe segment $14_2$ to include a trailing coupling portion $24_2$.

The primary conduit portion 20 of a pipe segment 14 is made of a composite material comprising reinforcing fiber (e.g., carbon fiber) impregnated in a resin matrix (e.g., epoxy resin). By using the appropriate fibers, fiber orientation, and/or resins, the mechanical properties of the composite portion 20 can be optimized for a specific orientation. In any event, composite materials will typically provide mechanical properties comparable to steel at less than half the weight. The lighter the primary conduit portion 20, the lighter the pipe segment 14, the lighter the pipestring 12, and thus less torque and drag are created during drilling. A reduction in torque/drag translates into increased drilling distances, both vertically and horizontally.

The leading coupling portion 22 and the trailing coupling portion 24 can be made of steel or any other suitable material and permanently attached to the lead end and trail end of the primary conduit portion 20, respectively. The leading coupling portion 22 can be a male coupling portion and the trailing coupling portion 24 can be a female coupling portion, or vice-a-versa. For example, as is best seen by referring additionally to FIG. 2B, the leading coupling portion 22 (portion $22_1$ of the first pipe segment $14_1$) can comprise an externally threaded stem 26 surrounded by a flange 28. The trailing coupling portion 24 (portion $24_1$ of the second pipe segment $14_2$) can comprise an internally threaded bore 30 surrounded by a flange 32.

Figure 2B:
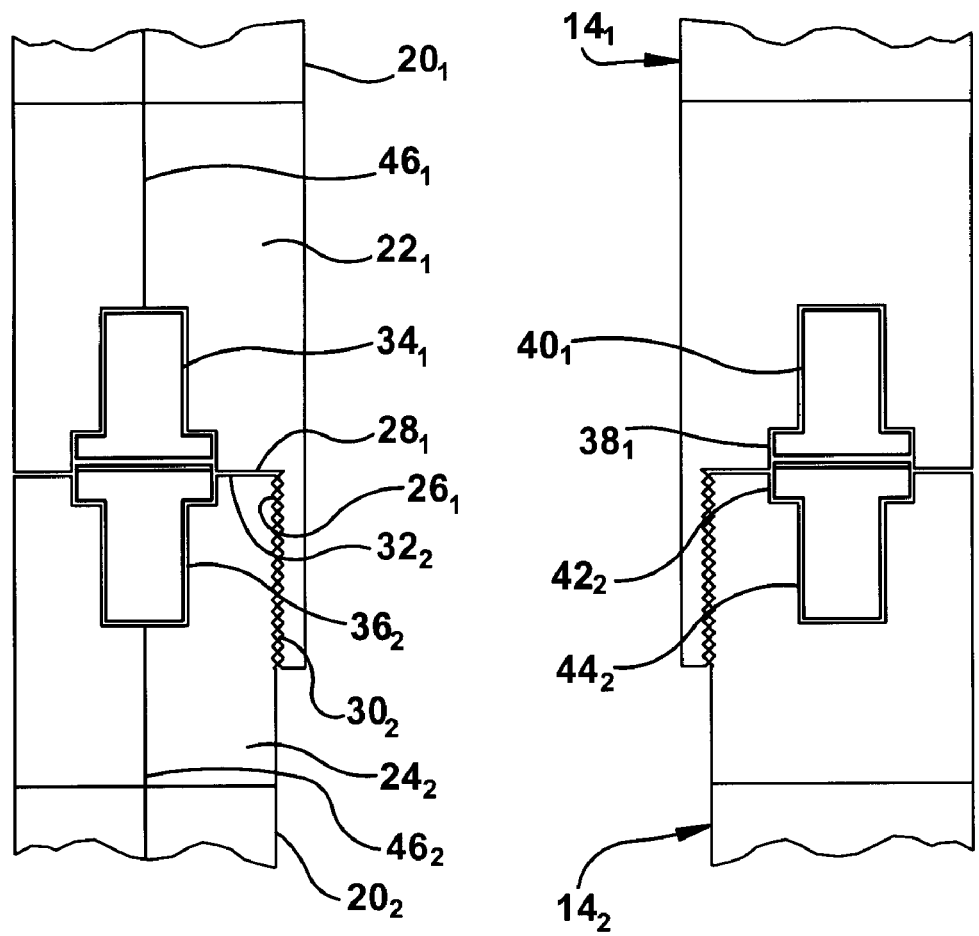
FIG. 2B is a close-up view of the leading coupling portion of the first pipe segment and the trailing coupling portion of the second pipe segment, these coupling portions including a trailing seal part and a leading seal part, respectively.
Figure 5B:
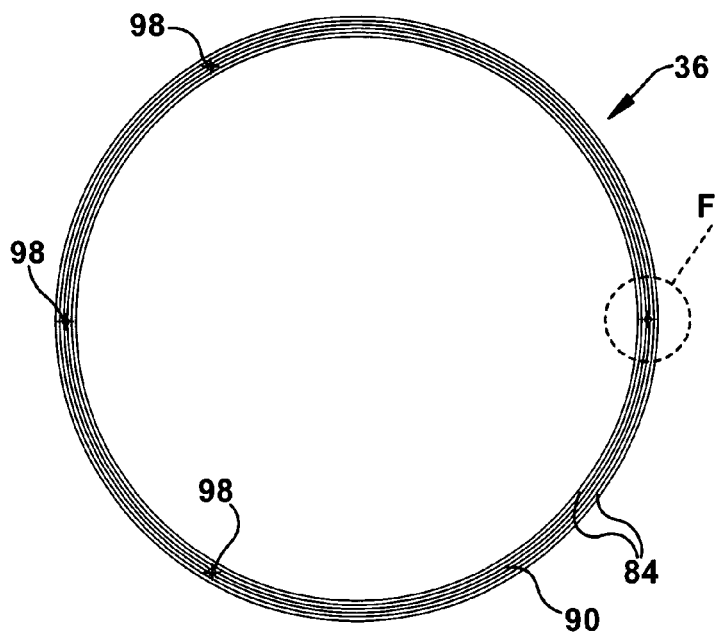
Figure 5D:
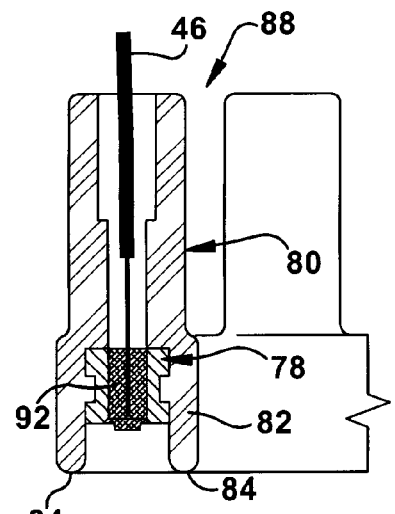
Figure 5A:
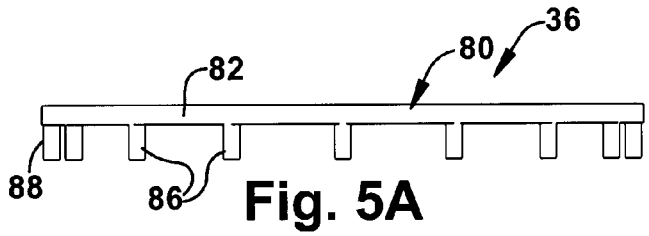
Figure 5C:
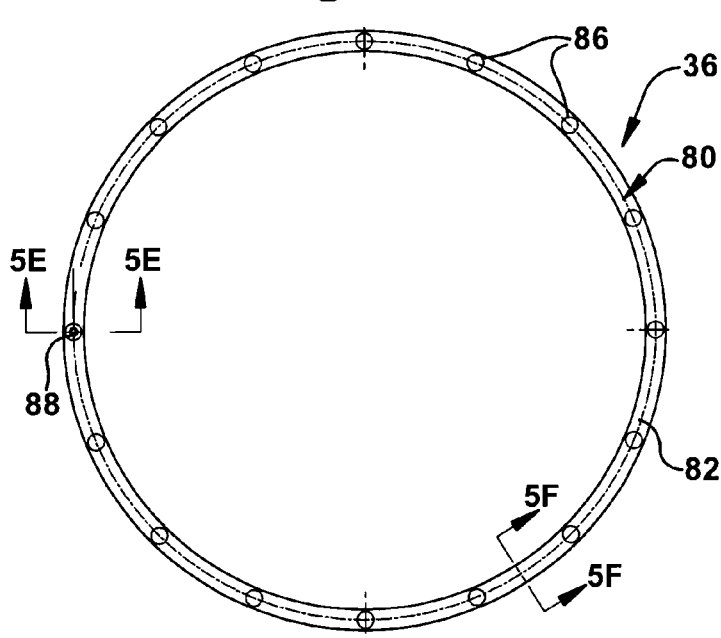
Figure 5E:
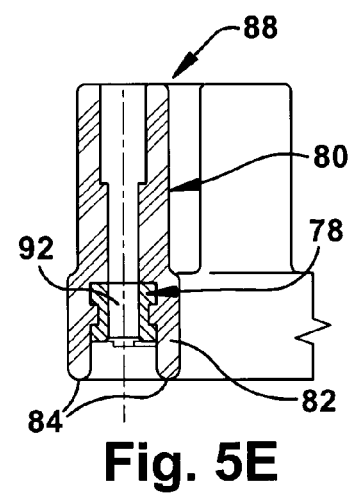
Figure 6B:
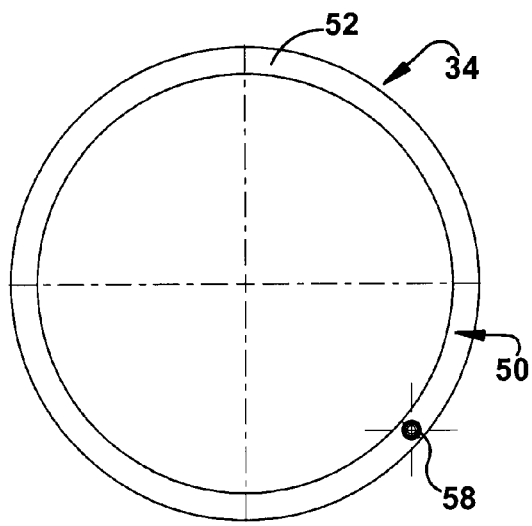
FIGS. 6A-6D are side, top, bottom, close-up, and sectional views of modified versions of the seal parts in an interfacing relationship.
Figure 6A:
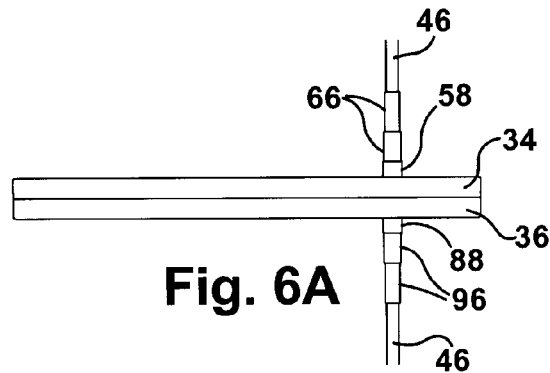
Figure 6C:
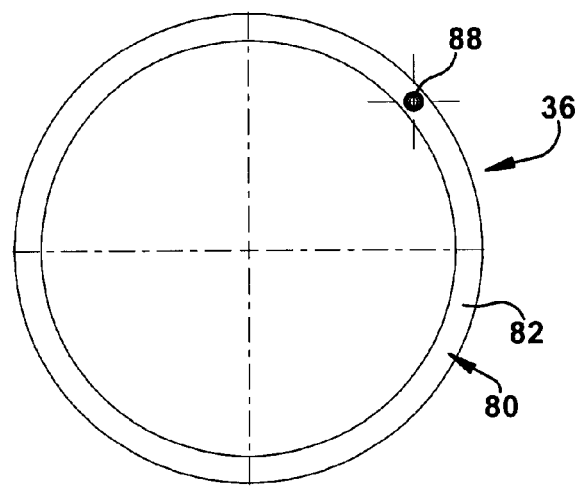
Figure 6D:
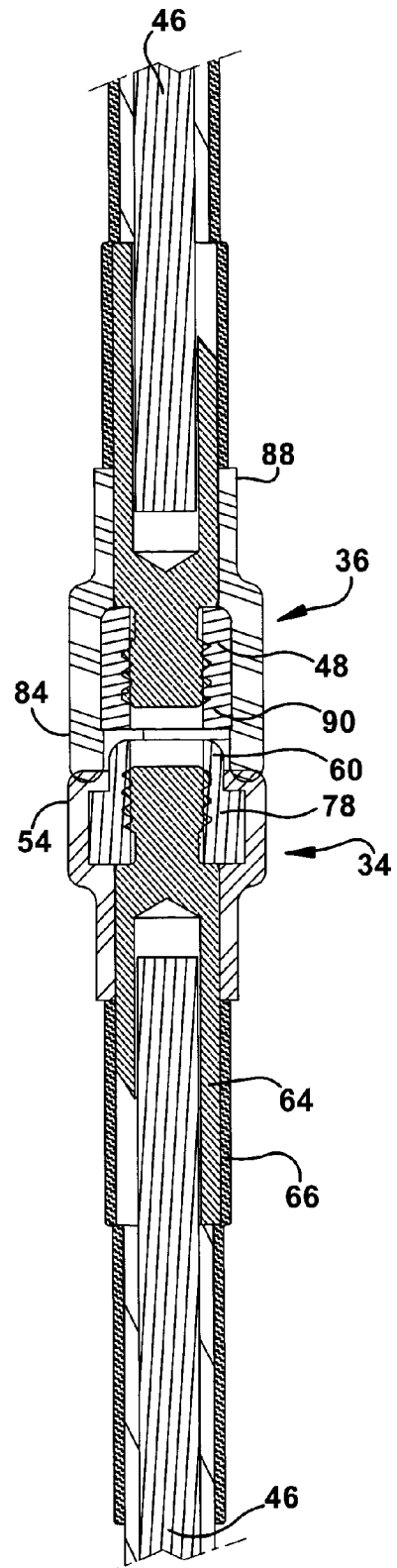

As is also best shown in FIG. 2B, each pipe segment 14 includes a leading seal part 34 (seal part $34_1$ in the first pipe segment $14_1$) installed in its leading coupling portion 22 and a trailing seal part 36 (seal part $36_2$ in the second pipe segment $14_2$) installed in its trailing coupling portion 24. In the illustrated embodiment, the seal parts 34 and 36 are positioned between the abutting flanges 28 and 32 (flanges $28_1$ and $32_2$) of adjacent pipe segments 14. The leading flange 28 (flange $28_1$) can include an annular groove 38 and pockets 40 (groove $38_1$ and pockets $40_1$) sized/shaped for receipt of the seal part 34 (part $34_1$) and the trailing flange 32 (flange $32_2$) can include an annular groove 42 and pockets 44 (groove $42_1$ and pockets $44_1$) sized/shaped for receipt of the seal part 36 (part $36_2$).

Each pipe segment 14 further comprises an electrical line 46 (electrical line $46_1$ in the first pipe segment $14_1$ and electrical line $46_2$ in the second pipe segment $14_2$). The electrical line 46 includes a leading end section extending through the leading coupling portion 22 (see electrical line $46_1$ in the first pipe segment $14_1$) and a trailing end section extending through the trailing coupling portion 24 (see electrical line $46_2$ in the second pipe segment $14_2$). In each pipe segment 14, the electrical line 46 extends between the leading coupling portion 22 and the trailing coupling portion 24 and through the primary conduit portion 20. The composite material of the primary conduit portion 20 will usually lends itself nicely to the embedment of the electrical line 46 into its matrix during fabrication.

As is explained in more detail below, the seal parts 34 and 36 provide an electrical path between the electrical line 46 in coupled pipe segments 14 (e.g., between the electrical line $46_1$ in the first pipe segment $14_1$ and the electrical line $46_2$ in the second pipe segment $14_2$). In a relatively long pipestring 12, this can allow an electrically conductive path to extend from the starting pipe segment (e.g., the pipe segment on which the drill bit 18 is mounted) to the last pipe segment (e.g., the pipe segment accessible from the rig platform). The electrical lines 24 can be simple wires, if, for example, the only purpose of the electrically conductive path is to allow the rig operator to verify that pipe segments are sealed and coupled. The lines 24 could additionally or alternatively be electrical power leads, control signal cables, fiberoptic filaments or other such lines if, for example, the electrically conductive path is used to acquire logging-while-drilling measurements and/or to operate drilling equipment.

Referring now to FIGS. 3A-3D, FIGS. 4A-4G, and FIGS. 5A-5H, the leading seal part 34 and/or the trailing seal part 36 are shown isolated from the rest of the pipe segment 14. Although the seal parts 34 and 36 are shown interfacing with each other in FIGS. 3A-3D for explanatory purposes, such interfacing will normally not occur prior to installation of the seal parts 34/36 into the respective coupling portions 22/24. Also, although subscripts are not used in the drawings, and each pipe segment 14 can include both a leading seal part 34 and a trailing seal part 36, seal parts 34/36 in the same pipe segment 14 will not interface. Instead, as shown in FIG. 2B, a leading seal part 34 in one pipe segment 14 will interface with the trailing seal part 36 in another pipe segment 14.

The leading seal part 34 comprises a ring 48 made of an electrically conductive material (e.g., a metal such as brass) and a seal body 50 made of an electrically insulating material (e.g., a natural or synthetic rubber). (FIGS. 4D-4G.) The seal body 50 is molded around the ring 48, preferably in one piece so as to avoid any seams or welds that could increase the risk of insulation cracks. The seal body 50 forms a rim casing 52 around the ring 48, this insulating casing 52 including interfacing shoulders 54. (FIGS. 4A-4G) The seal body 50 also forms rotation-preventing bosses 56 projecting axially from the casing 52 (FIGS. 4A, 4B and 4G) and an electrical connection boss 58 also projecting axially from the casing 52 (FIGS. 3A and 3D, FIGS. 4D and 4E). The ring 48 includes a ledge 60 projecting axially outward from between the interfacing shoulders 54 of the seal body 50 whereby this ledge 60 is not electrically insulated. (FIG. 3C and FIGS. 4A-4G.)

When the seal part 34 is installed in the illustrated leading coupling portion 22 (e.g., the coupling portion $22_1$ in FIG. 2B), the ring 48 and the rim casing 82 are positioned within the groove 38, with the ledge 60 being on the exposed side of the seal part 34. The bosses 56 and 58 are positioned within the pockets 40. The spacing of the bosses 56 and the corresponding spacing of the receiving pockets 40 results in the seal part 34 being braced against rotation and/or torque when the pipe segment 14 in which the seal part 34 is installed is rotated relative to another pipe segment 14 during end-to-end coupling of the segments in the pipestring 12. The electrical connection boss 58 is aligned for connection with leading end section of the electrical line 46. (FIGS. 3A and 3D, and FIG. 4D.)

The seal part 34 and/or the ring 48 has a soldering cavity 62 aligned with the electrical connection boss 58. (FIGS. 4D and 4E.) The leading section of the electrical line 46 extends through a passageway in the boss 58 and a stripped end thereof is situated in the soldering cavity 62. (FIG. 4D.) When installing the seal part 34 into the coupling portion 22 of the pipe segment 14, the leading section of the electrical line is inserted through the boss 58 into the solder cavity 62 and the cavity 62 is filled with solder material to form the electrical pathway from the electrical line 46 to the ring 48. This installation of the seal part 34 may occur before, after, or during the attachment of the coupling portion 22 to the primary conduit portion 20.

The trailing seal part 36 is similar to the leading seal part 34, in that it has an electrically conductive ring 78 and an insulating seal body 80. (FIG. 3D, and FIGS. 5D-5H.) The seal body 80 forms a rim casing 82 (with interfacing lips 84), rotation-preventing bosses 86, and an electrical connection boss 88. The ring 78 includes a ledge 90 which is recessed (rather than projecting) relative to the seal body 80 and surrounded by the interfacing lips 84. The trailing section of the electrical line 46 is electrically connected via the solder cavity 92 to the ring 78 and the seal part 36 is installed in trailing coupling portion 24 in the same manner as the seal part 34 is installed in the leading coupling portion 22. The ring 78 may have appropriately located tooling holes 98 if necessary to accommodate the molding process. (FIGS. 5G and 5H.)

When the leading coupling portion 22 of one pipe segment 14 is coupled to the trailing coupling portion 24 of another pipe segment (e.g., the stem 30 is threaded into the bore 26), the seal parts 34 and 36 interface. (FIGS. 3A-3D.) In this interfacing condition, the projecting ledge 60 of the leading seal part 34 is positioned within the interfacing lips 84 of the trailing seal part 36 and makes contact therewith. (FIG. 3D.) This establishes an electrical path between the seal parts 34 and 36 and thus between the electrical lines 24 in the coupled pipe segments. The insulating shoulders 54 of leading seal part 34 abut against the insulating lips 84 of the trailing seal part 36 whereby the seal bodies 50 and 80 together completely surround the conductive rings 48 and 78.

In FIG. 3A and FIG. 3D, the electrical lines 24 and/or the electrical connection bosses 58 and 88 are shown aligned with each other for ease in illustration. Such alignment is not necessary and it usually will not occur. Because the conductive rings 48/78 extend completely around the perimeter of the respective seal part 34/36, the relative alignment of electrical bosses 56/58 becomes irrelevant. Also, as the seal parts 34/36 rotate with, but not relative to, the coupling portions 22/24, the installation alignment of the seal part 34/36 relative to the leading/trailing end section of the respective electrical line 24 will not change during segment-to-segment coupling.

Figure 7B:
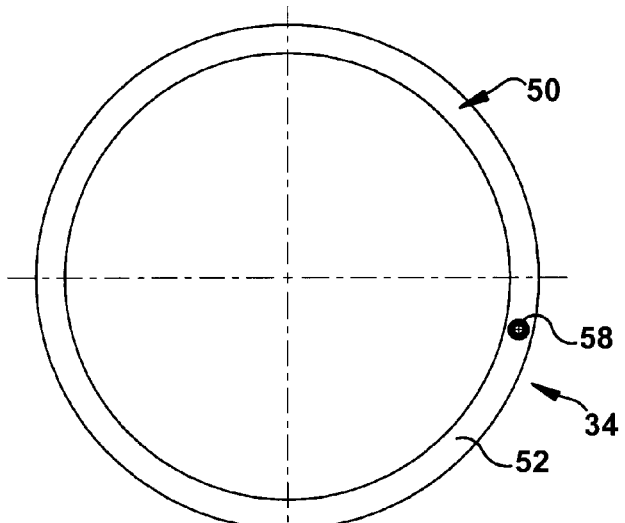
FIGS. 7A-7E are side, top, bottom, close-up and sectional views of the leading seal part shown in FIGS. 6A-6D.
Figure 7A:
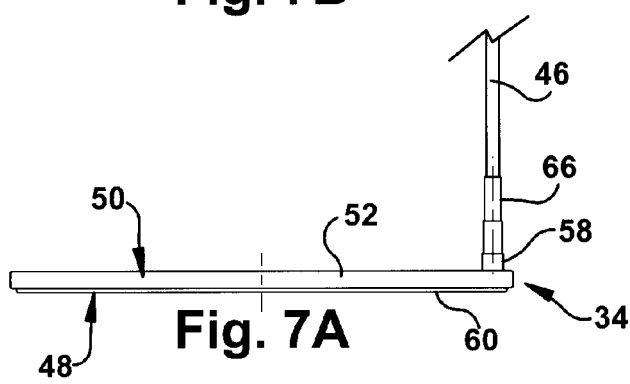
Figure 7D:
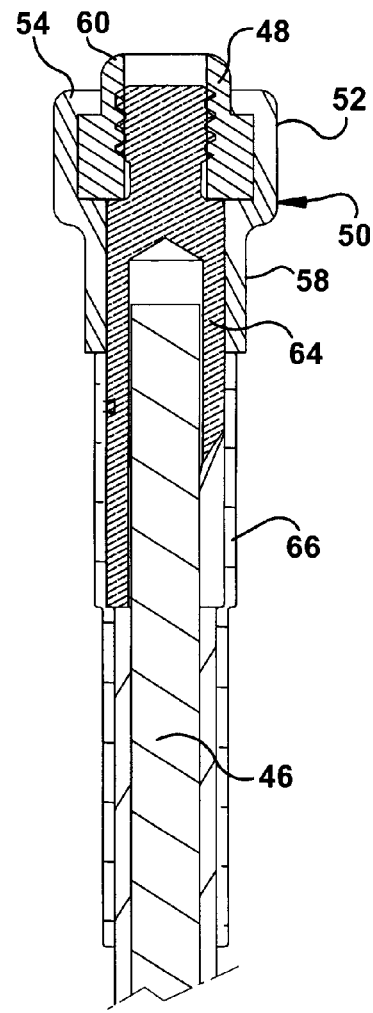
Figure 7C:
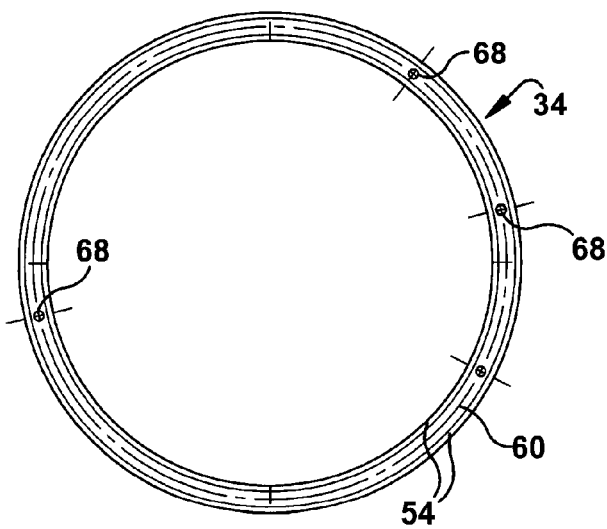
Figure 7E:
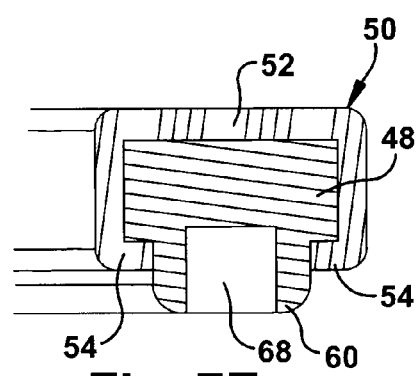

Referring now to FIGS. 6A-6D, 7A-7E, and 8A-8F, modified versions of the seal part 34 and/or the seal part 36 are shown. The seal parts 34/36 are similar to those shown in the third, fourth, and fifth series of drawings, wherein like reference numerals are used to designate like parts. The illustrated parts do not include rotation-preventing bosses 56/86 as they may not be necessary in low-torque or other applications. The seal parts 34/36 also do not include solder cavities 62/92 but instead include solder cups 64/94 which are threadably coupled to the respective rings 48/78. When installing the seal part 34/36 the leading/trailing section of the electrical line 46 is inserted into the solder cup 64/94 and heat shrink tube 66/96 overlaps the transition from the line 46 to the cup 64/94. This cup-tube arrangement may allow, as illustrated, a reduction in the height of the electrical boss 56/86. Tooling holes 68 may be provided in the ring 48 (FIG. 7E) and/or tooling holes 98 may be provided in the ring 78 (FIG. 8F) if necessary during molding.

One may now appreciate that the seal parts 34/36 provide a fluid seal between each coupled pair of coupling portions 22/24 and also provide a conductive path between the electrical lines 24 in the respective pipe segments, even in a relatively long pipestring (e.g., one used in drill rig). Although the pipestring 12, the pipe segments 14, the seal parts 34/36, and other components have been shown and described with respect to a certain embodiment or embodiments, it is obvious that equivalent alterations and modifications will occur to others skilled in the art upon the reading and understanding of this specification and the annexed drawings. In regard to the various functions performed by the above described elements (e.g., components, assemblies, systems, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A pipestring comprising:
   a first pipe segment comprising a primary conduit portion made of a composite material comprising reinforcing fiber impregnated in a resin matrix, a leading coupling portion permanently attached to the lead end of this primary conduit portion, a leading seal part installed in the leading coupling portion, and an electrical line embedded in the resin matrix of this primary conduit portion and having a leading end section extending into the leading coupling portion and electrically connected to the leading seal part; and
   a second pipe segment comprising a primary conduit portion made of composite material comprising reinforcing fiber impregnated in a resin matrix, a trailing coupling portion permanently attached to the trail end of this primary conduit portion, a trailing seal part, and an electrical line embedded in the resin matrix of this primary conduit portion and having a trailing end section extending into the trailing coupling portion and electrically connected to the trailing seal part;
   wherein the leading coupling portion of the first pipe segment and the trailing coupling portion of the second pipe segment are to be coupled together;
   wherein the seal parts interface to form a fluid seal between the first and second pipe segments and also provides an electrically conductive path between the electrical lines in the first and second pipe segments;
   wherein each seal part includes an electrically conductive ring and an electrically insulating seal body molded around the ring, and wherein the electrically conductive path includes a pathway from the end section of the respective wire to the ring of the respective seal part;
   wherein the ring of the seal part of one of the first pipe segment and the second pipe segment has a ledge which projects axially beyond the seal body;
   wherein the ring of the seal part of the other of the first pipe segment and the second pipe segment has a ledge which is recessed axially within the seal body; and
   wherein the ledges of the respective rings are to be abutted against each other to form an electrical pathway between the seal parts.

2. A pipestring as set forth in claim 1, wherein the trailing coupling portion of the first pipe segment is one of a male coupling portion or a female coupling portion, and the leading coupling portion of the second pipe segment is the other of a female coupling portion or a male coupling portion.

3. A pipestring as set forth in claim 1, wherein the coupling portions are rotated relative to one another to couple them together and wherein each seal part rotates with, but not relative to, the coupling portion in which it is installed.

4. A pipestring as set forth in claim 1, wherein the seal body of each seal part is formed in one piece.

5. A pipestring as set forth in claim 1, wherein the coupling portions of the pipe segments include abutting flange surfaces and wherein the interfacing seal parts are positioned between these flange surfaces.

6. A pipestring as set forth in claim 5, wherein the flange surfaces each include an annular groove in which the respective seal part is positioned within this groove.

7. A pipestring as set forth in claim 6, wherein each seal part includes an electrical connection boss through which the end section of the electrical line in the respective pipe segment is inserted.

8. A pipestring as set forth in claim 7, wherein each electrical connection boss is formed by the seal body of the respective seal part.

9. A pipestring as set forth in claim 7, wherein the coupling portion in which the seal part is installed includes a pocket extending axially from the groove and wherein the electrical connection boss is positioned within this groove.

10. A pipestring as set forth in claim 1, wherein the seal bodies together completely surround the conductive rings.

11. A pipestring as set forth in claim 1, wherein each seal part includes rotation-preventing bosses and wherein the coupling portion in which the seal part is installed includes pockets in which these rotation-preventing bosses are positioned.

12. A pipestring as set forth in claim 1, wherein the ring of each seal part includes a solder cavity into which the end section of the respective electrical line is inserted and a solder material within this cavity forms an electrical pathway from the electrical line to the ring.

13. A method of installing the seal parts in the pipestring set forth in claim 12, said method comprising the steps of, for each pipe segment, installing the seal part in the coupling portion, inserting the electrical line into the solder cavity, and filling the cavity with the solder material to form the electrical pathway from the electrical line to the ring.

14. A pipestring as set forth in claim 1, wherein the ring of each part includes a recess for receiving a solder cup and wherein the respective electrical line is inserted into the solder cup and soldered therein to form an electrical pathway from the electrical line to the solder cup to the ring.

15. A method of assembling the seal parts in the pipestring set forth in claim 14, said method comprising the steps of, for each pipe segment, positioning the seal part in the coupling portion, inserting the electrical line into the solder cup, heating the coupling portion thereby heating the solder cup and fusing the electrical line to the solder cup to form the electrical pathway from the electrical line to the solder cup to the ring.

16. A pipestring comprising a series of pipe segments,
each pipe segment including a primary conduit portion made of a composite material comprising reinforcing fiber impregnated in a resin matrix, a steel leading coupling portion on one end of the primary conduit portion, a trailing coupling portion on the other end of the primary conduit portion, a leading seal part installed in the leading coupling portion, a trailing seal part installed in the trailing coupling portion, and an electrical line embedded in the matrix of the primary conduit portion and extending between from the coupling portions and through the primary conduit portion;
each seal part including an electrically conductive ring and an electrically insulating molded seal body, the seal parts interfacing to form a fluid seal between each pair of coupling portions of adjacent pipe segments and to also provide a conductive path between the electrical lines in the respective pipe segments;
wherein the coupling portions of the pipe segments include abutting flange surfaces and wherein the interfacing seal parts are positioned between these flange surfaces;
wherein the ring of one of the leading seal part and the trailing seal part of each pipe segment has a ledge which projects axially beyond the seal body and the ring of the other of the leading seal part and the trailing seal part of each pipe segment has a ledge which is recessed axially within the seal body; and
wherein the ledges of the respective rings are to be abutted against each other during coupling of the pipe segments to form an electrical pathway between the seal parts.

17. A drill assembly comprising the pipestring set forth in claim 16, and a drill bit mounted on a beginning pipe segment in the pipestring, and wherein the bit is rotated to drill bore through the earth when power is applied to the last pipe segment in the pipestring.

* * * * *